United States Patent [19]

Wieschel

[11] 4,352,622
[45] Oct. 5, 1982

[54] WAREHOUSE CRANE WITH PIN-ENGAGEABLE TOTE PANS

[75] Inventor: John E. Wieschel, Hartland, Wis.

[73] Assignee: Harnischfeger Corporation, Milwaukee, Wis.

[21] Appl. No.: 219,446

[22] Filed: Dec. 23, 1980

[51] Int. Cl.³ .............................................. B65G 47/00
[52] U.S. Cl. .................................... 414/277; 414/608; 414/661
[58] Field of Search ............... 414/234, 235, 277, 280, 414/281–283, 286, 661, 663–666, 785, 608

[56] References Cited

U.S. PATENT DOCUMENTS 1,969,419  8/1934  Martin ................................. 414/234
4,010,855  3/1977  Smith ............................. 414/280 X Primary Examiner—Robert G. Sheridan
Attorney, Agent, or Firm—James E. Nilles

[57] ABSTRACT

A warehouse crane with individual storage areas for containing tote pans, each tote pan having handles on its opposite end walls. A pair of reversibly driven, counter-rotating endless chains is mounted on the carriage for movement about a generally horizontal, orbital path, each of the chains also having a radially inner pin and outer pin for movement with their respective chain in orbital paths. The inner pin is pushingly engageable with the handles to push the pans into the storage areas. The outer pin is releasably engageable with the handle of the pans to pull the pans from the storage areas.

6 Claims, 13 Drawing Figures

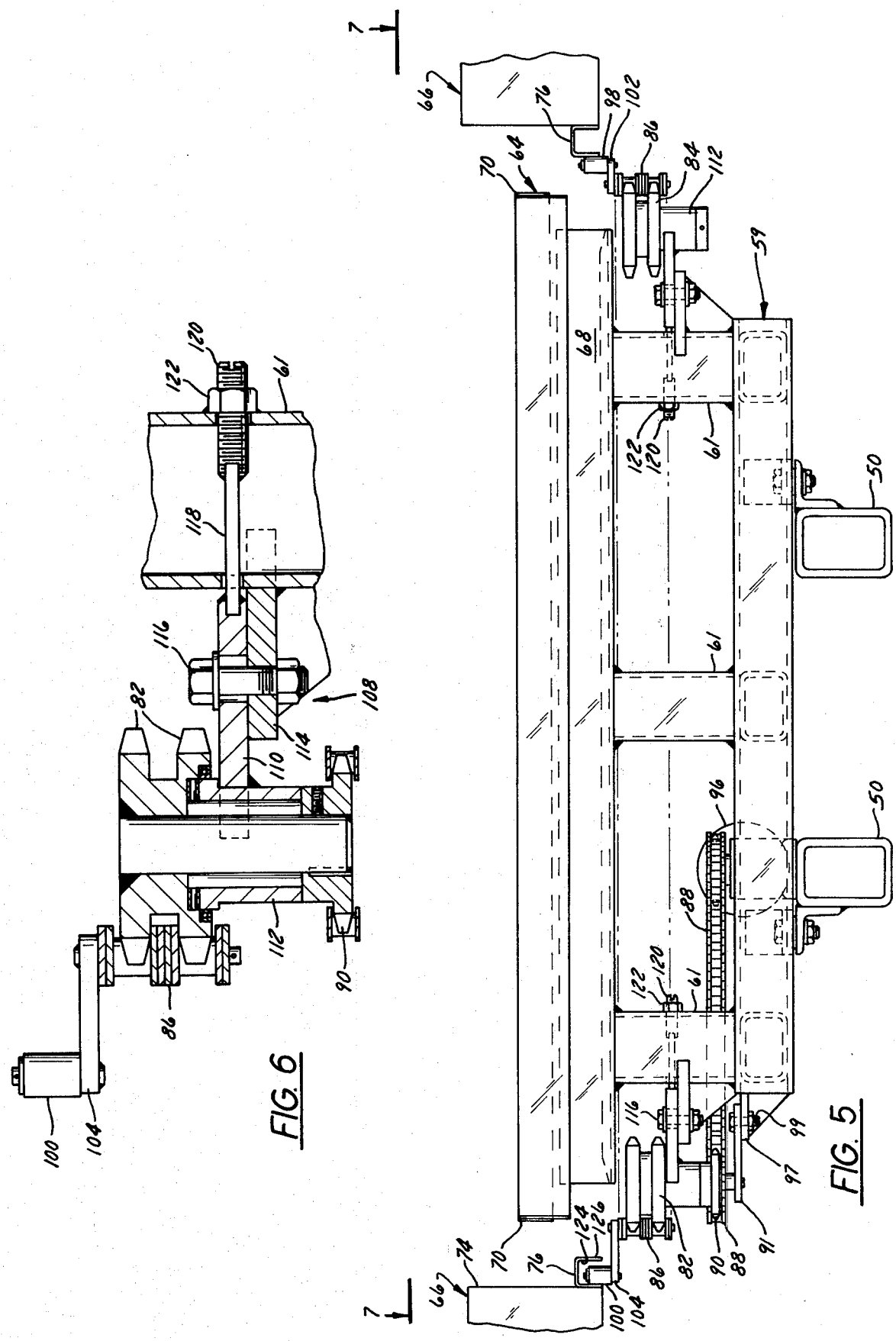

WAREHOUSE CRANE WITH PIN-ENGAGEABLE TOTE PANS

BACKGROUND OF THE INVENTION

This invention relates generally to warehouse cranes with a vertically movable carriage for retrieving tote pans from individual storage areas along an aisle. In particular, it relates to an improved tote pan engaging means, the improvement comprising a pair of vertically stationary pins on two elongated orbits.

Tote pan pullers are generally known in the art and include many different configurations including those with pin-type pullers mounted on a chain. For example, in U.S. Pat. No. 4,010,855, issued to Smith on Mar. 8, 1977, has a plurality of pins mounted on a rotating chain to engage tote pan handles, each chain having a long and two short pins. The handles are attached to the aisle-facing sides of the tote pans and are of a generally inverted U-shape, the lower end of the handle ending at a point well above the height of the bottom of the pan. After the pan has been placed upon the vertically-movable carriage, the smaller pins move towards its handle-engaging side. The short pins do not engage any portion of the handle, but pass under it, engaging the side of the tote pan to push the pan into the desired storage area at a proper depth for retrieval during a subsequent operating cycle. If the vertical position of the shorter pins with respect to the handle were changed so as to enable those shorter pins to engage the outer portion of the handle, the short pins would push the tote pan and its handle farther into the storage area than is desired, which could make the pan subsequently irretrievable.

Several other tote pan pullers are disclosed in the art, including those described in U.S. Pat. No. 4,007,846, issued to Pipes on Feb. 15, 1977, and U.S. Pat. No. 3,883,008, issued to Castaldi, on May 13, 1975. Pipes discloses an apparatus having a pair of fingers vertically movable to engage the pan handle, each of the fingers moving the pan about half the distance from the position in which the pan is fully contained with the storage area to the position in which the pan is centered upon the carriage. The operation of such a tote pan puller requires the cooperation of several limit switches, solenoids, clutches, and spring-biased mechanical elements, and is thus rather complex and subject to undesirably frequent failure due to mechanical or electrical malfunction.

Castaldi discloses an apparatus enabling retrieval or return of pans with a slide movable towards and away from the pans. The slide is positioned between a pair of endless belts and moves on elongated means and in a path parallel to the length of those belts. Each of the pans has handles for enabling removal of the pans from the storage areas or bin locations by two similar pins. The pins are normally in a horizontal position and below a horizontal plane including the upper surface of the belts, and thus the horizontally-disposed pins do not engage the handle and cannot move the pan from the bin location. Upon actuation of a solenoid, the pins are either vertically erected to extract the pan from its bin location by engaging the included space between the handle and the body of the pan, vertically erected prior to the slide reaching its extreme rightward or leftward position so that the pin will be poised to engaged the outer surface of the handle and thereby permit replacement of the pan at its proper location in the bin. The many relays, solenoids, and limit switches necessary to determine when a pin must be raised or lowered subject this apparatus to the same kinds of mechanically-and electrically-based vulnerabilities as Pipes. In addition, both Pipes and Castaldi require that pans of very consistent, reproduceable lengths be used to ensure that the vertically movable pins will engage the included space between the handle and the side of the tote pan rather than the underside of the pan or the lower lip of the U-shaped handle.

In addition, existing tote pan pullers have rather complicated drive systems for their tote pan-engaging fingers or pins, necessitating many adjustments to ensure tightness in the chains of the drives or to make a phase adjustment in the pin cycle and to thereby ensure the synchronous movement of those pins.

SUMMARY OF THE INVENTION

The present invention provides a warehouse crane having individual storage areas for containing tote pans having opposite end walls, each with a handle. A pair of reversibly driven, counter-rotating endless chains mounted on the crane and for movement about a generally horizontal, orbital path. Each of the chains has a radially inner pin and an outer pin attached to and for movement with their respective chain in orbital paths. The inner pin is pushingly engageable with the handles to push those pans into the storage areas. The other pin is releasably engageable with the handle of the pans to pull and restore those pans from the storage areas.

The chains are part of two chain mechanisms, which each further comprise a pair of sprockets journalled in the carriage and around which the pin chain is entrained. One of this pair of sprockets in each chain mechanism is fixedly attached to a driven sprocket and one of the two driven sprockets has mounted on opposite sides thereof a pair of idler sprockets. The idler sprockets are rotatably engaged to the driven sprockets with a motor-powered chain. By moving the idler sprockets laterally and transversely relative to the carriage, simultaneous tensioning of the powered chain and positioning of the inner and outer pins is permitted. Such positioning of the pins ensures their synchronous movement towards simultaneous engagement with the tote pan handle to provide smooth operation.

The inner and outer pins rotate with the chains in two orbits and in a fixed horizontal plane. Even if the vertical position of the pins with respect to the tote pans to be retrieved from or relocated in the storage compartments is somewhat inaccurate, there is no danger that either pin will contact a part of the tote pan handle or tote pan that it was not intended to and thereby push the pan from the carriage and too deeply into the storage compartment.

The novel apparatus is of simple construction, requiring very few electrical and mechanical sensing and actuating devices, and is therefore very reliable and subject to very little maintenance. Because the pins do not move vertically to engage the handles, but rather rotate in a pair of fixed, horizontal orbits, the tote pans used with the present invention may be constructed of lengths having a somewhat greater variance than tote pans used in the prior art. In addition, the tension of the motor-powered drive chain and the position of the pins relative to one another are readily adjusted by the lateral and transverse movement of a pair of idler sprockets. Other objects and advantages of the invention will appear below.

BRIEF DESCRIPTION OF THE DRAWINGS

FIG. 5 is an enlarged, elevational view of the carriage taken along lines 5—5 of FIG. 3;

FIG. 6 is a sectional view, on an enlarged scale, of a portion of FIG. 5 and showing the pin chain adjustment means;

DESCRIPTION OF A PREFERRED EMBODIMENT

Figure 1:
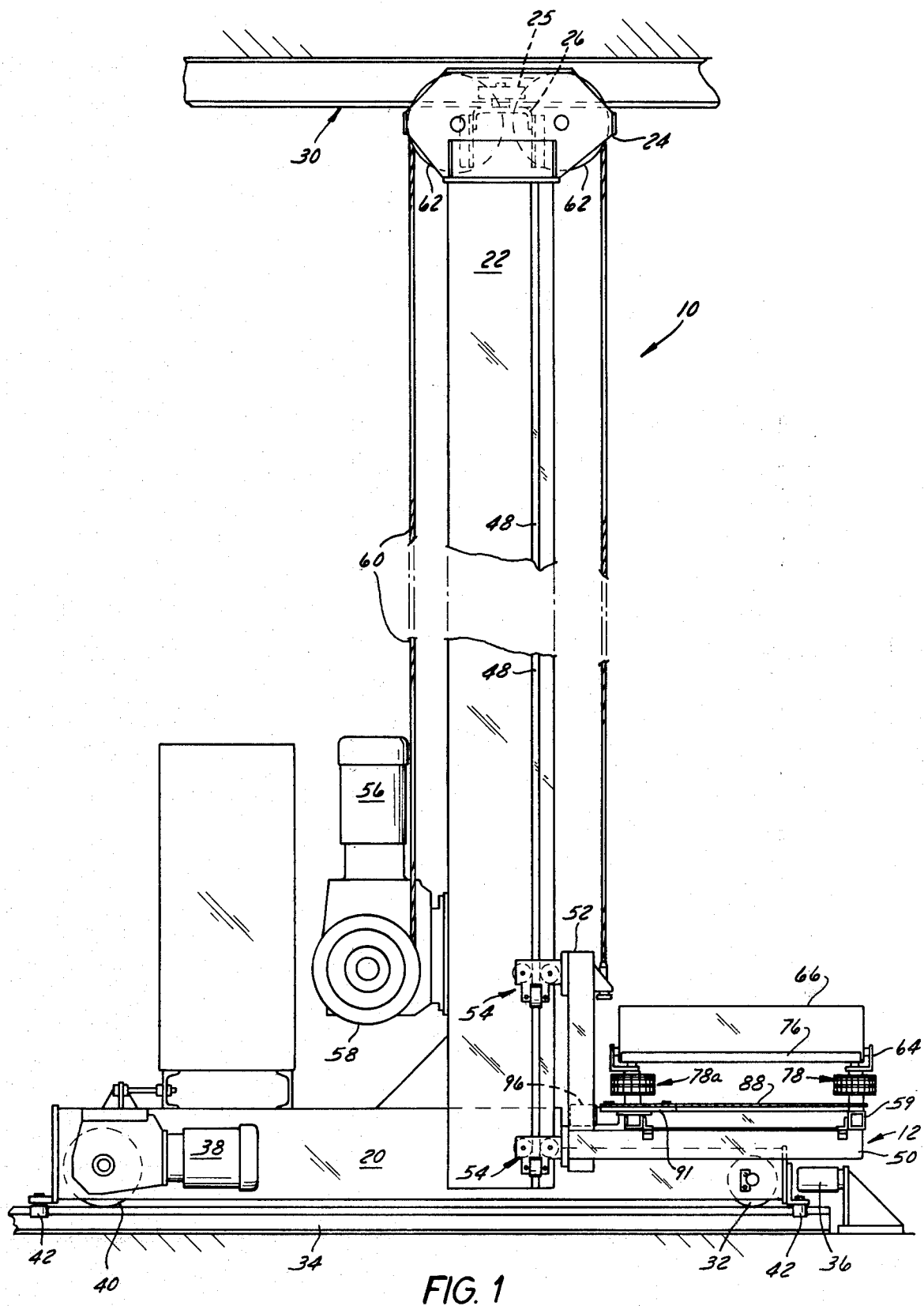
FIG. 1 is a side elevational view of a warehouse crane in accordance with the invention, the carriage being shown at its lowermost position on the mast.
Figure 2:
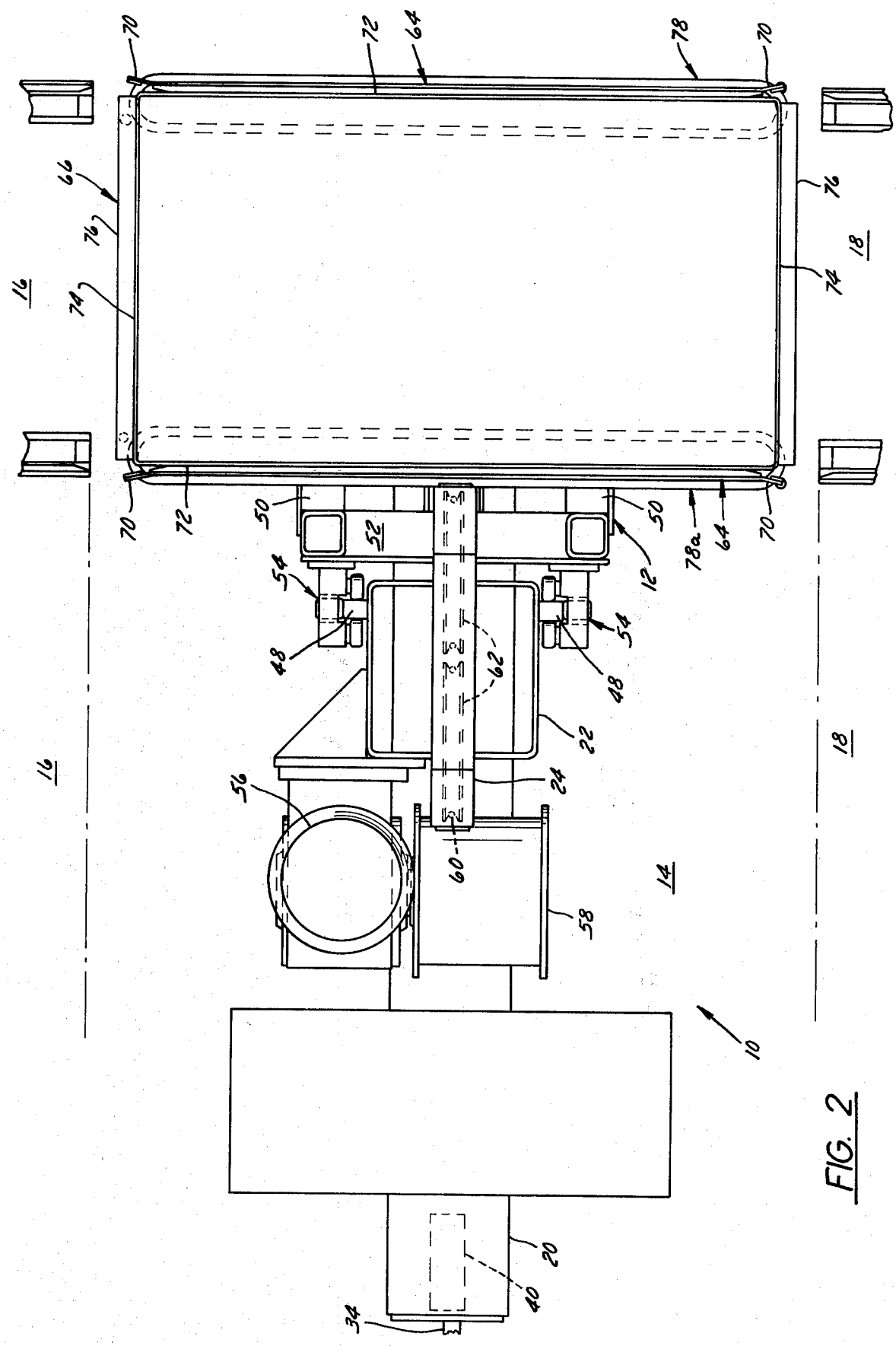
FIG. 2 is a top plan view, on an enlarged scale, of the crane shown in FIG. 1.

The present invention comprises a warehouse crane 10 (FIG. 1) having a carriage 12 that may be positioned elevationally along that crane, and which is also movable in a horizontal direction. In this way, the carriage 12 may be moved in an aisle 14 which has on either of its sides compartmentalized storage racks 16 and 18. Typically, the racks are fabricated of steel beam structural members and two racks which are mirror images of each other are disposed opposite each other across the aisle, with the storage compartments or storage areas arranged in horizontal rows and vertical columns.

HORIZONTAL CRANE MOVEMENT

Means are provided for moving the crane 10 horizontally along the aisle in a stable manner. The crane comprises a horizontally-extending bridge 20 fabricated of structural steel such as I-beams and which is parallel to and substantially centrally located within the aisle 14. A vertically-disposed mast 22 is rigidly attached to and extends upwardly from the bridge 20. The mast 22 supports, at its upper end, a sheave guard 24, on which is rigidly mounted a cross member 26 provided with a plurality of guide wheels 25 on vertical axes. An overhead guide rail 30 in the form of an I-beam and extending parallel to aisle 14 is mounted above the mast 22, as for example to the ceiling of the building in which the crane 10 operates, and the wheels 25 bear against the opposite sides of the vertically extending portion of the guide rail 30 to thereby serve to stabilize the crane 10 and prevent it from tipping. Bridge 20 has rotatably mounted to the right of its structure (with respect to FIG. 1) an idler wheel 32 riding on a straight rail or track 34 which extends from a home station down aisle 14 and which is parallel to aisle 14 and overhead guide rail 30 and substantially centrally located within the aisle. The home station is at one end of the aisle and comprises mechanical means for preventing the crane 10 from travelling off the end of its track 34, such means typically being a mechanical bumper stop 36 rigidly attached to the aisle floor. The bridge 20 is moved in forward and reverse directions (to the left and right directions with respect to FIG. 1) by electric crane motor 38 which is mounted on the bridge and connected to a drive wheel 40 riding on track 34. Guide rollers 42 are provided on each side of the drive wheel 40 and idler wheel 32 and ride on each side of track 34 to provide lateral stability to the bridge as it moves along the track.

CARRIAGE MOVEMENT

Means are provided for moving the carriage 12 vertically on the mast 22. A carriage track 48 extends vertically on both of the storage rack-facing sides of mast 22 and substantially along the entire height of the mast, providing support and guidance for the vertical movement. The carriage 12 comprises a pair of horizontally-extending frame members 50. A vertically-extending rear wall 52 is rigidly attached to frame members 50, but the rest of the carriage is open at its front, left, and right sides (FIG. 1). The carriage 12 is secured to and guided by the track 48 of mast 22 by a plurality of roller assemblies 54 secured to the rear wall 52 by welding or other attachment means. A hoist motor 56 is supported by mast 22 and connected to drive drum 58 and a wire rope 60 is wrapped around and attached at one of its ends to drive drum 58. The wire rope 60 is reeved over a pair of sheaves 62 supported by and rotatably mounted within sheave guard 24 and is attached at its other end to the rear wall 52 of the carriage to permit raising and lowering of the carriage upon movement of the rope 60 by the hoist motor 56 and drum 58. Control means (not shown) for the motor 56 are provided remotely, as is well known in the prior art.

TOTE PAN AND CARRIAGE SUPPORT STRUCTURE

Means are provided for supporting a tote pan and tote pan puller, being shown generally in FIGS. 1–3 and 5. The lower carriage framework 59 is mounted to horizontal frame members 50, and a plurality of vertically-extending spacer members 61, which members 61 support a pair of guide rails 64, are attached to framework 59. The guide rails 64 support the tote pans 66 as they are moved from their storage areas to the carriage. Each bracket typically includes an angled portion 68 at its upper end and for providing a guiding means for the pans as they are horizontally transported. The angled portions include flared ends 70 to further guide and to minimize the potential for damage to the pans 66.

The tote pans have two side 72 and two end walls 74, each end wall having fixedly attached an engageable handle 76 of an inverted, substantially U-shaped cross-section. The handles are engaged by pins, as will be explained, to permit a pan's retrieval from and return to a storage area.

Figure 7:
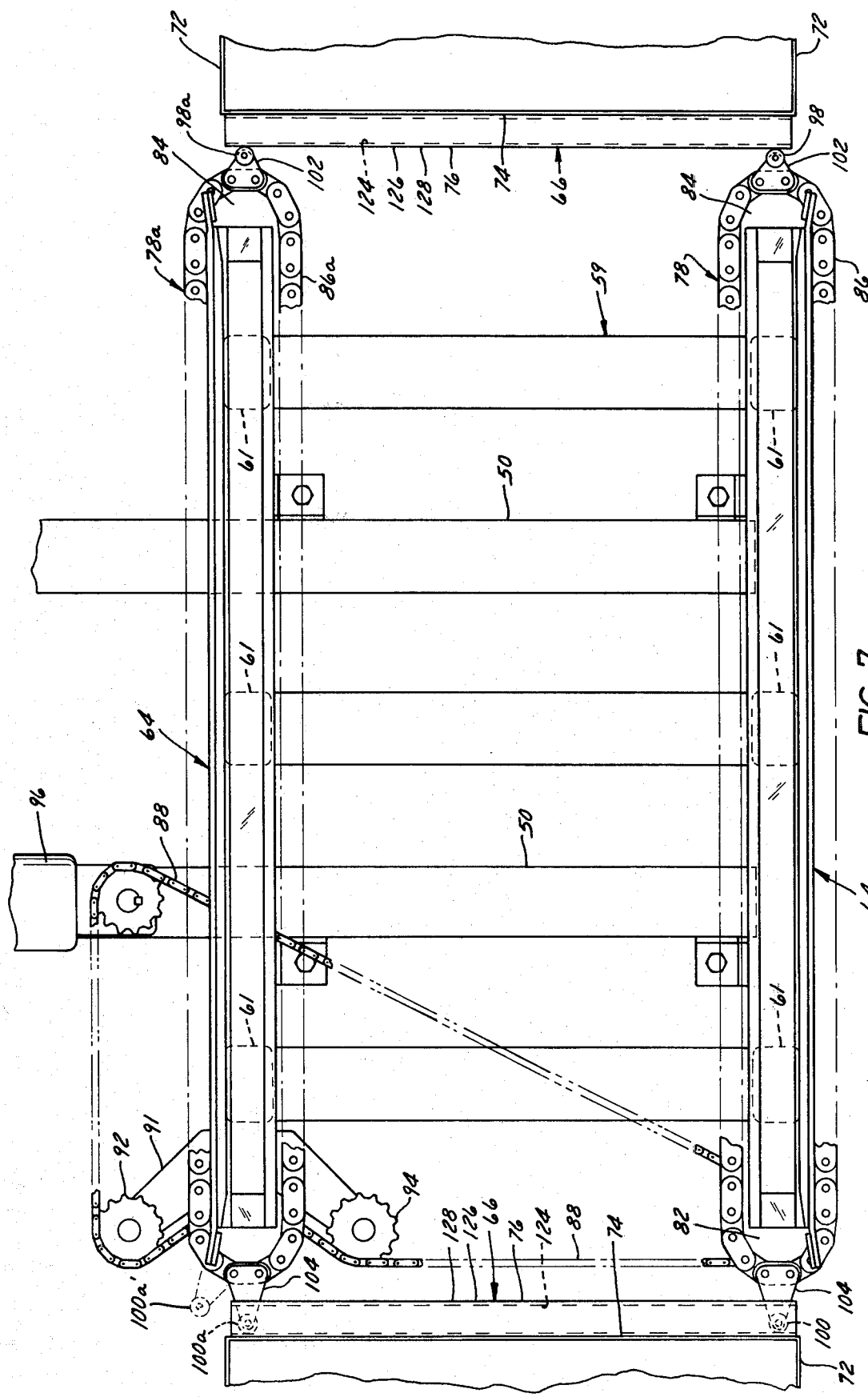
FIG. 7 is a plan view of the carriage taken along lines 7—7 of FIG. 5.

Referring now to FIG. 7, the pair of chain mechanisms 78 and 78a are shown in top plan. These mechanisms, located on opposite sides of the carriage and which in operation are counterrotating, are supported by a housing 112 for the bearings of their sprockets, the housing being slidably attached to the spacer members 61 as will be explained. The chain mechanisms 78 and 78a are mirror images of each other, and only one of the two will be referred to in this discussion. The components of each mechanism are identical, and are numbered identically except for the inclusion of the subscript "a" on one set of components. The mechanism 78 comprises a pair of sprockets 82 and 84 around which a pin chain 86 is entrained. In this embodiment, sprockets 82 and 84 are double sprockets and pin chain 86 is a double chain, but this is merely a matter of design preference and not necessary to the successful operation of the apparatus. A motor-powered chain 88 drives the pin chains through driven sprockets 90 attached to sprockets 82, and the pair of pin chains 86 are reversibly driven and counter-rotating.

On either side of one of the driven sprockets 90 are a pair of idler sprockets 92 and 94, rotatably engaged to the driven sprockets with the powered chain 88. The idler sprockets 92 and 94 are respectively mounted on brackets 63 and 65, which brackets are weldably attached to a frame member 59, and are also laterally and transversely movable relative to the carriage. The motor-powered chain 88 is driven by a motor 96 to which it is coupled in a conventional manner, and the chain 88 causes rotation of pin chains 86 about sprockets 82 and 84 in a generally horizontal and flat orbital path and in a common horizontal plane.

Fixedly positioned on each chain 86 is a first or inner pin 98 and a second or outer pin 100, the pins being attached to the chain 86 with first 102 and second arms 104, respectively. The pins are positioned perpendicularly to the horizontal plane of the chains 86. The arms are positioned in the same plane as chains 86, and outwardly of the path formed by the chains 86. Second arm 104 is longer than first arm 102, and the relative lengths of the outer and inner arms are determined by the projection of the pan handle outwardly from the pan. The pins 100 and 98 are fixedly attached to one of the ends of their respective arms. For this reason, first or inner pin 98 rotates in an orbit 106 outwardly of the orbit formed by the path of the chain, and second or outer pin 100 rotates in an orbit 108 outwardly of the orbit formed by the path of first pin 98. Pins 98 and 100 are of substantially similar size, and are spaced opposite one another and in the orbit by an angle of substantially 180° (FIGS. 7-13).

Chain tensioning means 108 (FIG. 6) are provided for each of the sprockets 82 and 84, and typically include a locking tab 110 weldably attached to the bearing housing 112 of the shaft for sprocket 82. The locking tab 110 is slidably movable on a rigid, fixed plate 114, which is rigidly attached to each end spacer member 61. Nut and bolt means 116 may be tightened to prevent or loosened to permit relative slidable movement of locking tab 110 and plate 114. Locking tab 110 is moved by an adjusting, transversely guiding pusher rod 118, which is in turn moved by a set bolt 120 secured to the spacer member with lock nut 122. If a pin chain 86 is too loose, for example, on its sprockets 82 and 84, it may be tightened in a simple manner. Nut and bolt means 116 are loosened to permit relative slidable movement of tab 110 and plate 114. Tightening the pin chains in this manner also ensures that the pins 98 and 98a or 100 and 100a will be positioned to engage the pan or pan handle simultaneously, and thereby prevent undue strain on one chain.

Figure 4:
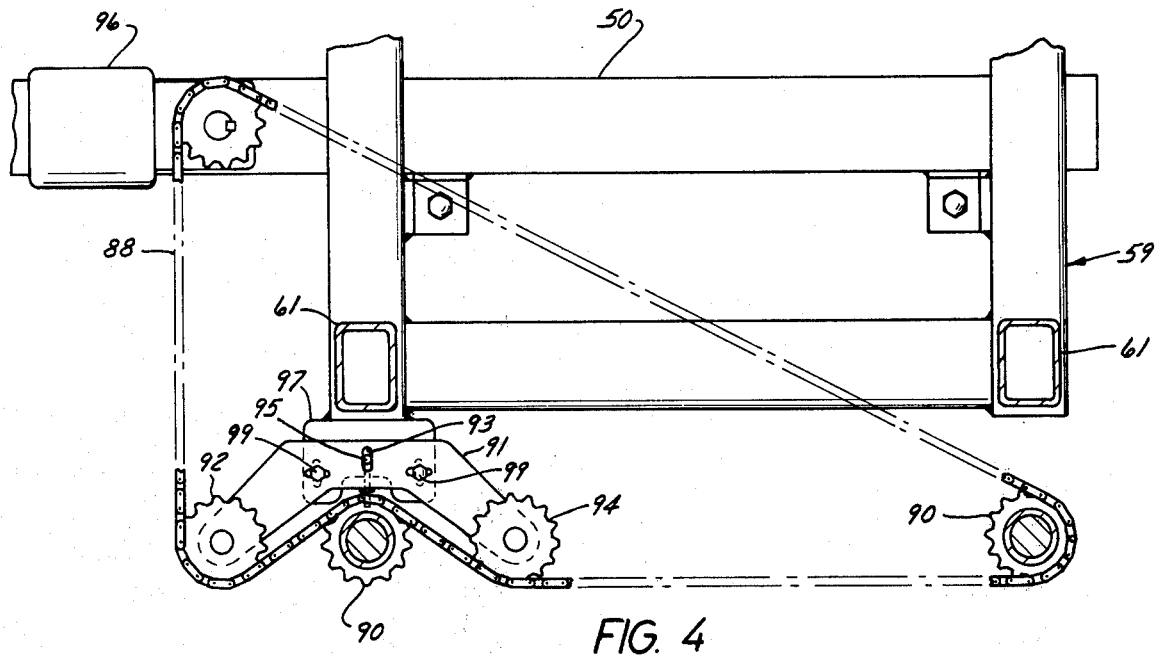
FIG. 4 is a sectional view of a portion of the carriage taken along lines 4—4 of FIG. 3.
Figure 3:
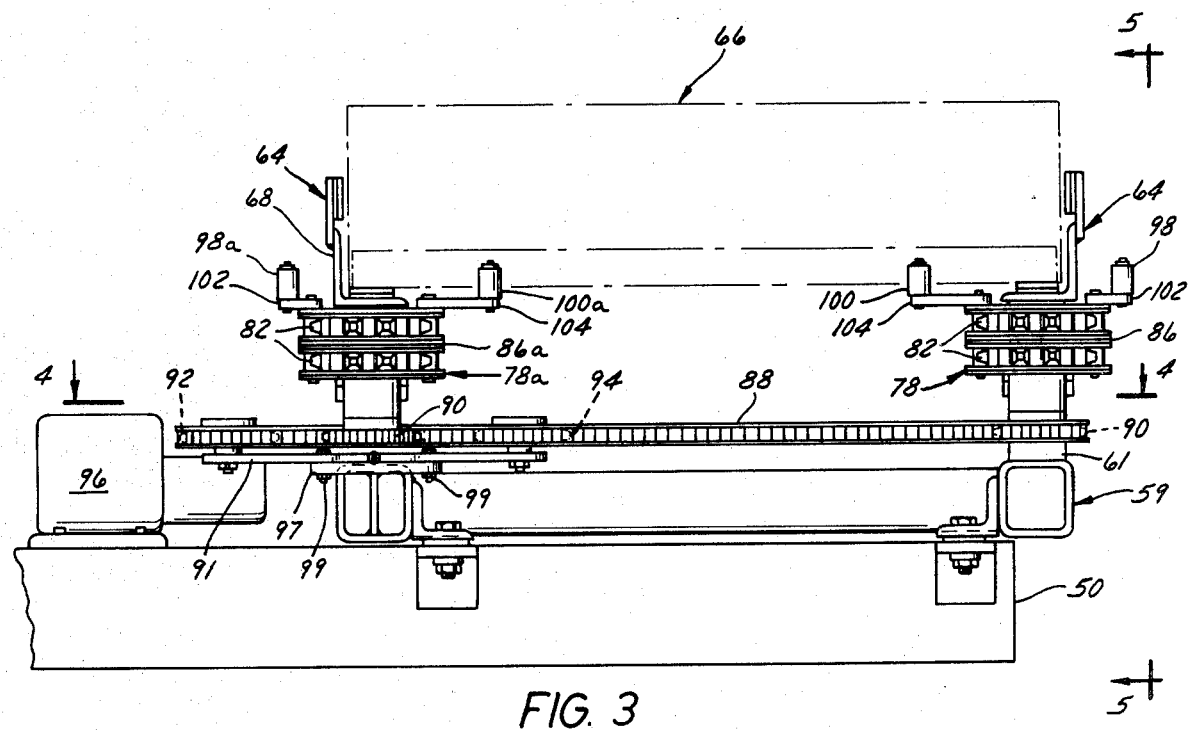
FIG. 3 is a side elevational view, on an enlarged scale, of the carriage portion of the crane shown in FIG. 1.

As stated above, idler sprockets 92 and 94 (FIGS. 4 and 7) are laterally and transversely movable to permit synchronization of the pins and tensioning of the motor-powered chain. In FIG. 7, adjacent pin 100a on the pin chain 86a, a pin 100a' is shown in phantom. If the actual position of pin 100a on pin chain 86a were as represented by 100a', that pin would be out of phase with its counterpart 100 on the pin chain 86. The idlers 92 and 94 are journalled in a yoke 91, which is laterally slidable along a slot 93 and guided by a stationary guide pin 95 rigidly secured to a bracket 97. Movement of the yoke 91 along the slot during normal operation of the apparatus is prevented by a pair of bolts 99 securing the yoke 91 to the bracket 97. If, for example, the powered chain 88 is insufficiently tensioned and the pin 100a were at the position indicated by 100a', the bolts 99 would be loosened and the yoke 91 would be moved laterally (downwardly with respect to FIG. 4) to tension the chain 88. After the chain was sufficiently tensioned, the adjustment of the position of pin 100a' could be readily accomplished by rotating the yoke (counterclockwise with respect to FIG. 4) to cause counterclockwise rotation of the driven sprocket 90, the sprocket 82, the pin chain 86a, and the pin 100a' until the pin reaches its proper position as shown at 100a. Finally, the bolts 99 are retightened.

OPERATION OF THE TOTE PAN PULLER

Figure 8:
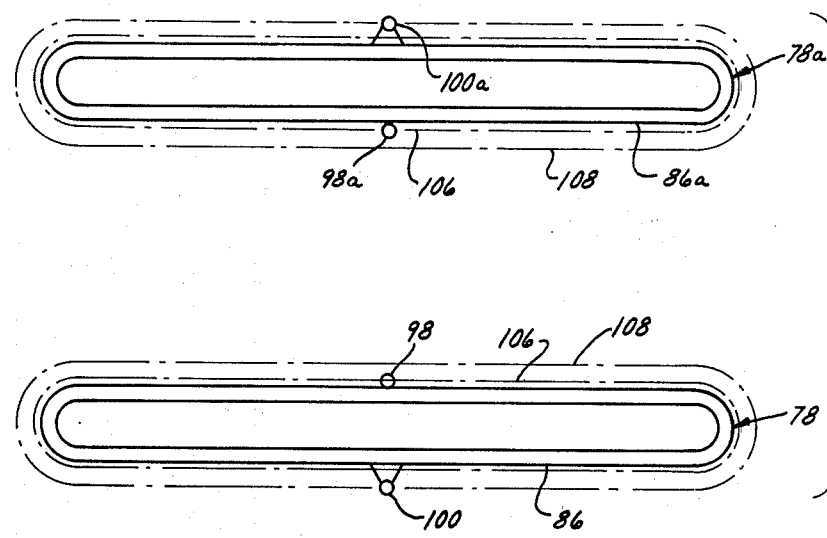
FIGS. 8 to 13 are motion diagrams taken in plan and illustrating sequentially the movement of the pins around their respective orbits to engage the tote pans and their tote pan handles.
Figure 9:
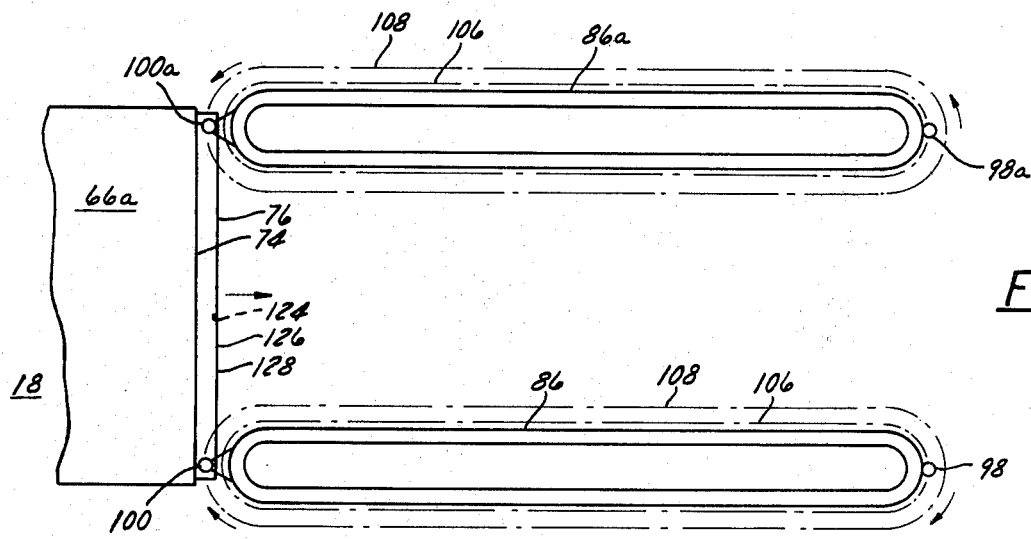
Figure 10:
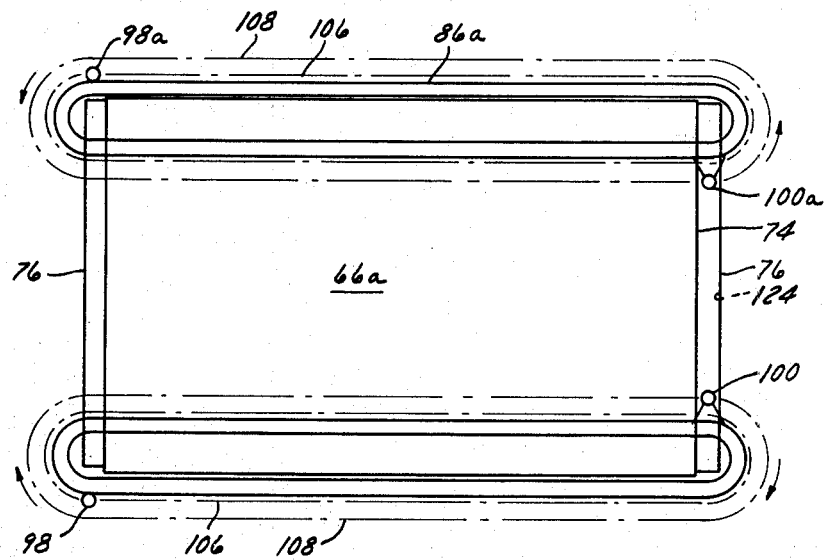
Figure 11:
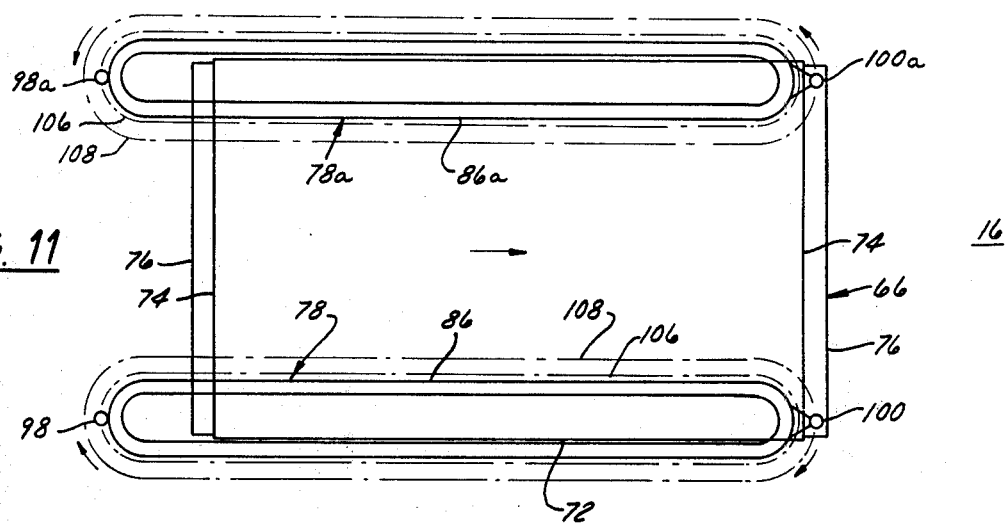
Figure 12:
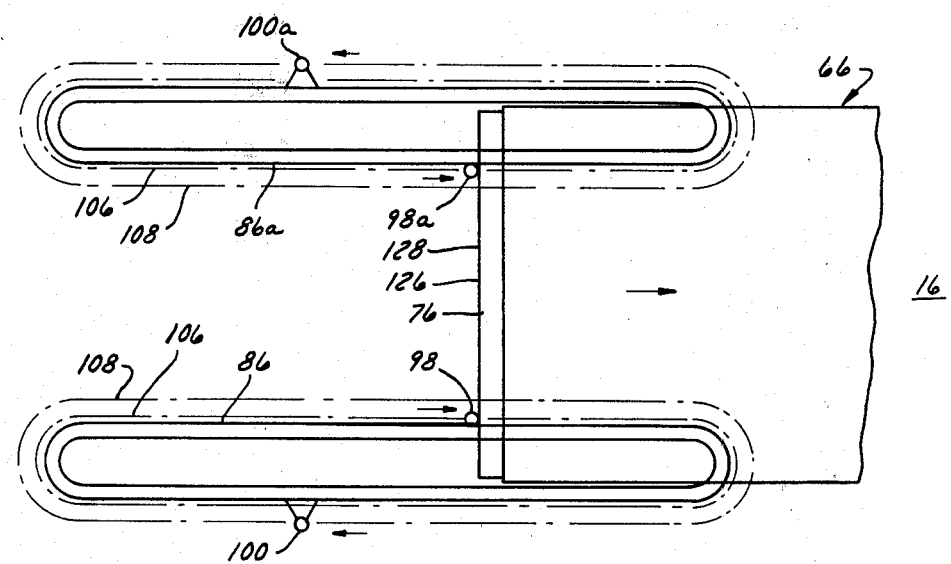
Figure 13:
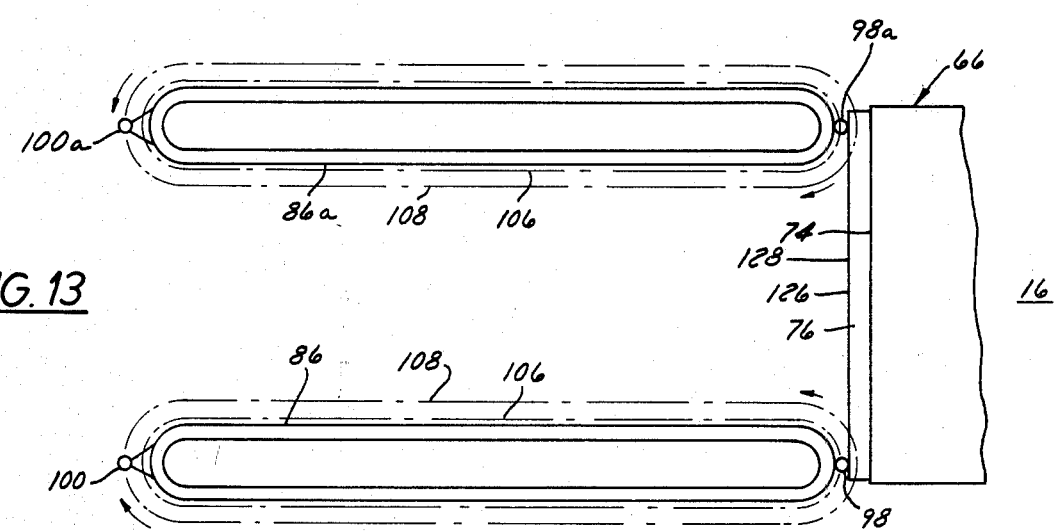

The operation of the puller will be described starting with the pins in a neutral position as shown in FIG. 8. The carriage is adjacent two storage compartments on either side of the aisle, the leftwardmost containing a tote pan 66a. Rotation of the pin chains is commenced, with the pin chain 86a in FIG. 9 rotating in the counterclockwise direction. The pin chain 86 is arranged to rotate in the opposite or clockwise direction, and the pins 100 and 100a approach the tote pan 66a. As pins 100 and 100a approach this pan and the outer end of their orbits 108, they enter the underside of the handle 76, that is, the portion of the handle between the end wall 74 and the inside 124 of the handle's vertically-extending lip 126. Continuing in their orbits, pins 100 engage the inside 124 of the lip and cooperate to pull pan 66a from its storage area and to a centered position on the carriage 12 (FIG. 10), at which point the chains 86 are stopped. If it is then desired to return the tote pan to its original storage location, the direction of the rotation of pin chains 86 and 86a is merely reversed, so that the pin chain 86a and its pin 100a will be rotating in a clockwise direction and the pin chain 86 and its pin 100 will be rotating in a counterclockwise direction. The pins 100 and 100a engaged with the right hand end wall 74 of pan 66a and move it fully into storage compartment. If, however, after the removal or addition of articles, it is desired that the pan 66a be placed in an unoccupied storage area on the side of the aisle opposite its original location, the pin chains 86 and 86a are restarted in their original directions so that the pin 100a on the pin chain 86a moves in a counterclockwise direction and the pin 100 on the pin chain 86 moves in a clockwise direction. As the pins 100 and 100a reach the rightwardmost ends of their orbits 108, the directions being with respect to FIG. 11, they move out of the underside of the handle 76, and as the pin chains continue their rotation, pins 98 engage the outside 128 of the lip 126 of the tote pans 66a leftwardmost handle 76 (FIG. 12). Continued rotation of the pins pushes the pan to its position in storage rack 16, with the pan's end wall flush with the face of the rack and its handle positioned outwardly of the rack for engagement by pins 100 when it is next desired to retrieve pan 66a.

The orbital rotation of the pins 98 and 100 and their placement for rotation on arms 102 and 104 of different lengths ensures that first pin 98 will engage only the outside of a handle lip and that second pin 100 will engage only the surface adjacent the underside of handle 76. Even if the carriage 12 were somewhat too high relative the pan 66a, there is no danger that the second pin could engage the outside of a lip and push the pan

RECAPITULATION

The present invention provides an apparatus for removing tote pans from storage areas, particularly storage areas arranged on opposite sides of an aisle and in horizontal rows and vertical columns. The apparatus has pins mounted on a vertically-positionable carriage and that revolve about different orbits and which do not move vertically to engage the pans. These features result in operation that is not overly sensitive to improper vertical positioning of the carriage, and also in an apparatus that is mechanically and electrically simple and thus relatively free of maintenance and breakdown problems. The dual orbitting pin feature of the apparatus eliminates the inconvenience caused by a pin engaging a portion of the pan or handle that it was not intended to engage and to thereby push a pan's handle so deeply within its storage area as to make it irretrievable on the next operating cycle.

We claim:

1. In a warehouse crane having individual storage areas for containing tote pans, said tote pans having opposite end walls, each with a handle, a pair of reversibly driven, counterrotating endless chains mounted on said crane and for movement about a generally horizontal, orbital path, each of said chains also having a radially inner pin and an outer pin attached to and for movement with their respective chain in orbital paths, said inner pin being pushingly engageable with said handles to push said pans into said storage areas, and said outer pin being releasably engageable with said handle of said pans to pull and push said pans from said storage area, said inner pin being attached to said chain with a first arm and said outer pin is attached to said chain with a second arm, said second arm being longer than said first arm, both of said first and said second arm having its pin-attached end positioned outwardly of said chain path.

2. The warehouse crane set forth in claim 1, wherein said inner and outer pins remain in a fixed vertical position during movement of said pins about their respective orbital paths.

3. The warehouse crane set forth in claim 1, wherein said inner and outer pins remain in a fixed vertical position during movement of said pins about their respective orbital paths.

4. The warehouse crane set forth in claim 5, wherein said chains comprise a double chain and wherein said sprockets journalled in said crane and about which said pin chains are entrained comprise double sprockets.

5. The crane set forth in claim 1 further characterized in that each of said chains have a pair of sprockets journalled in said crane and around which said chain is entrained, one of said pair of sprockets of each chain being fixedly attached to a driven sprocket, one of said driven sprockets having a pair of idler sprockets mounted on either side thereof, said idler sprockets rotatably engaged to said driven sprockets of said pair of chains with a powered chain, said idler sprockets being movable to thereby permit tensioning of said powered chain and synchronous positioning of said pins, and further comprising motor means for powering said powered chain.

6. In the warehouse crane having an elevationally positionable carriage for movement along an aisle and for alignment with individual storage areas for containing tote pans, said tote pans having two side walls and two end walls, each of said end walls having a handle fixedly attached thereto, a pair of reversibly driven, counter-rotating endless chain mechanisms including pin chains and mounted on said carriage and for movement about a generally horizontal and flat, orbital path and in a common horizontal plane, each of said chains also having a first pin and a second pin of substantially the same size and attached to said chain by a first and a second arm, respectively, said second arm being longer than said first arm, both of said arms having their pin-engaging ends positioned outwardly of said chain path, said first and second pins being arranged for movement with said chains on orbital paths successively farther outwardly of said chain path, said first pin being releasably engageable with the outer surface of said handles to push said pans from said carriage into said storage areas, and said second pin being releasably engageable with the underside of said handle and said end walls of said pans to pull said pans from said storage areas to said carriage and push said pans from said carriage into said storage areas, each of said chain mechanisms further comprising a pair of sprockets journalled in said carriage and around which said pin chain is entrained, one of said pair of sprockets in each chain mechanism being fixedly attached to a driven sprocket, one of said driven sprockets having a pair of idler sprockets mounted on either side thereof, said idler sprockets rotatably engaged to said driven sprockets of said pair of chain mechanisms with a motor-powered chain, said idler sprockets being movable relative to said carriage to thereby permit tensioning of said powered chain and synchronous positioning of said first and second pins.

* * * * *